(12) United States Patent
Parkes et al.

(10) Patent No.: US 7,536,337 B2
(45) Date of Patent: May 19, 2009

(54) METHOD FOR COMPUTING PAYMENT DISCOUNTS TO ACHIEVE BUDGET-BALANCE IN EXCHANGES

(75) Inventors: David C. Parkes, Boston, MA (US); Marta Eso, Peekskill, NY (US); Jayant R. Kalagnanam, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 09/918,990

(22) Filed: Jul. 31, 2001

(65) Prior Publication Data

US 2003/0028414 A1 Feb. 6, 2003

(51) Int. Cl.
*G06Q 40/00* (2006.01)
(52) U.S. Cl. .................................. 705/37; 705/10
(58) Field of Classification Search .................. 705/14, 705/10, 26, 37, 7
See application file for complete search history.

(56) References Cited

U.S. PATENT DOCUMENTS

2001/0014868 A1* 8/2001 Herz et al. .................... 705/14

FOREIGN PATENT DOCUMENTS

WO    WO 9621192 A1 * 7/1996

OTHER PUBLICATIONS

Jeffrey K. et al ("Generalized Vickery Auctions," University of Michigan, Jul. 1994).*

David C. Parkers, et al. Achieving Budget-Balance With Vickrey-Based Payment Schemes in Exchanges, In Proc. 17th Int'l Joint Conference on Artificial Intelligence (IJCAI-01). pp. 1161-1168.
Sven de Vries, et al., "Combinatorial Auctions: A Survey," Jun. 15, 2001, pp. 1-67.
Theodore Groves, "Incentives in Teams," Econometrica, vol. 41, Issue 4 Jul. 1973.
Jayant R. Kalagnanam, et al., "Computational Aspects of Clearing Continuous Call Double Auctions With Assignments Constraints and Indivisible Demand," pp. 1-15.
Salvador Barbera, et al., "Strategy-Proof Exchange," Econometrica, vol. 63, Issue 1 (Jan. 1995), 51-87.
Daniel Lehmann, "Truth Revelation in Approximately Efficient Combinatorial Auctions," pp. 1-35.
Michael H. Rothkofp, et al. "Computationally Manageable Combinatorial Auctions," DIMACS Technical Report 95-09, Apr. 1995.
Tuomas Sandholm, An Aligorithm for Optimal Winner Determination in Combinatorial Auctions.
Jeffrey K. Mackie-Mason, "Generalized Vickrey Auctions," Jul. 1994.
William Vickrey, Conterspeculation, Auctions, and Competitive Sealed Tenders, Journal of Finance, vol. 16, Issue 1 (Mar. 1961), 8-37.

(Continued)

*Primary Examiner*—Thomas Dixon
*Assistant Examiner*—Ojo O Oyebisi
(74) *Attorney, Agent, or Firm*—F. Chau & Associates, LLC (57) ABSTRACT

Disclosed is a method for computing payment discounts awarded to winning agents in an exchange, the method comprising including a Vickrey discount to each of the winning agent as the difference between available surplus with all agents present minus available surplus without the winning agent, and computing said payment discounts by adjusting the Vickrey discounts so as to constrain the exchange to budget-balance.

12 Claims, 6 Drawing Sheets

OTHER PUBLICATIONS

William E. Walsh, et al., "Combinatorial Auctions for Supply Chain Formation," EE'00, Oct. 17-20, 2000.

Peter R. Wurman, et al., "Flexible Double Auctions for Electronics Commerce: Theory and Implementation," Jul. 13, 1998, pp. 1-21.

Edward H. Clarke, "Multipart Pricing of Public Goods," pp. 15-33.

Roger B. Myerson, "Optimal Auction Design," Mathematics of Operations Research vol. 6, No. 1, Feb. 1981, pp. 58-73.

* cited by examiner

| Distance functions | | Payment rules | |
|---|---|---|---|
| $L_2$ | $L_2(v, v') = (\sum_i (v'_i - v_i)^2)^{1/2}$ | Threshold | $\max(0, v'_i - C),\ C \geq 0$ |
| $L_\infty$ | $L_\infty(v, v') = \max_i |v'_i - v_i|$ | Threshold | $\max(0, v'_i - C),\ C \geq 0$ |
| Relative error | $L_{RE}(v, v') = \sum_i (v'_i - v_i)/v'_i$ | Small | $v'_i$ if $v'_i \leq C,\ C \geq 0$ |
| Product error | $L_\pi(v, v') = 1 / v'_i \cdot v_i$ | Reverse | $\min(v'_i, C),\ C \geq 0$ |
| Squared relative error | $L_{RE2}(v, v') = \sum_i (v'_i - v_i)^2 / v'_i$ | Fractional | $\mu v'_i,\ 0 \leq \mu \leq 1$ |
| Weighted error | $L_{WE}(v, v') = \sum_i v'_i |v'_i - v_i|$ | Large | $v'_i$ if $v'_i \geq C,\ C \geq 0$ |

METHOD FOR COMPUTING PAYMENT DISCOUNTS TO ACHIEVE BUDGET-BALANCE IN EXCHANGES

FIELD OF THE INVENTION

This invention relates to methods for determining payments made to and received by winning agents in exchanges, in particular, to methods that determine payments so as to induce agents to reveal their true preferences as well as provide Budget-Balance for the market-maker.

BACKGROUND OF THE INVENTION

An exchange is a market mechanism that allows trading between multiple sellers and buyers (collectively called agents) by aggregating their supply and demand to clear the market. It can be advantageous to allow several heterogeneous items to be traded in the same exchange simultaneously (rather than in separate exchanges, simultaneously or sequentially) if there is synergy or substitutability between items. Such exchanges are termed combinatorial because agents can express their preferences across combinations (bundles) of items. Note that auctions are a special case of exchanges where there is only one seller (forward auction) or one buyer (reverse auction).

While a great number of possible exchange schemes could be constructed (with many rounds and complex rules), we may focus on a single-round, or "one-shot" exchange, by virtue of the Revelation Principle, as derived by Roger B. Myerson, *Optimal auction design,* Mathematics of Operations Research, Vol. 6 No. 1 February 1981, the disclosures of which are incorporated by reference herein in their entirety. While the exchange is open, agents may submit bids (requests to buy items for no more than the bid price) and asks (offers to sell items for at least the ask price). After the exchange closes the exchange engine clears the market by computing a matching of asks to bids and determining the payments to be made or received by the agents. Ideally, the trades and the payments should be determined in such a way that the following economic properties are induced:

Allocative Efficiency (AE): The set of trades are determined so as to maximize the total valuation over all agents participating in the exchange.

Budget-Balance (BB): The total payment collected by the exchange from the buyers should be at least the total payment made by the exchange to the sellers.

Individual Rationality (IR): No agent pays more than his bid price or receives less than his ask price.

Incentive Compatibility (IC): The best strategy for agents is to submit bids and asks that reveal their true valuations for the items.

Budget-Balance means that the exchange does not operate at a loss, while Individual Rationality ensures that no agent is made worse off by participating in the exchange. These two conditions must be met by any exchange. Allocative Efficiency is desirable because this is what ensures that the exchange realizes full profit. Incentive Compatibility is a very desirable property because it relieves agents from speculating about the bids and asks of other agents.

Unfortunately the well-known analysis of Myerson and Satterthwaite, *Efficient mechanisms for bilateral trading,* Journal of Economic Theory 28:265-281, 1983, demonstrates that no exchange can be AE, BB, and IR simultaneously. This result holds irrespectively of IC. Theoretical work so far has focused on trying to design mechanisms where BB, IR, and IC are required and AE is relaxed, such as are described in Myerson and Satterthwaite, Id.; R. McAfee, *A dominant strategy double auction,* J. of Economic Theory 56:434-450, 1992; and Barbera et al., *Strategy-proof exchange,* Econometrica 63(1):51-87, 1995. Practical implementations usually ignore IC and AE.

Also known in the art is the so-called Generalized Vickrey Payment Scheme, which is AE, IR and IC, but not BB, such as are described in Varian & MacKie-Mason, *Generalized Vickrey auctions,* Technical report, University of Michigan (1995); E. H. Clarke, *Multipart pricing of public goods,* Public Choice 11:17-33, 1971; and T. Groves, *Incentives in teams,* Econometrica 41:617-631, 1973, the disclosures of all of which are incorporated by reference herein in their entirety. These are based on the so-called Vickrey pricing scheme wherein discount payments are awarded to winning agents at the end of trading, such as is described in W. Vickrey, *Counterspeculation, auctions, and competitive sealed tenders,* Journal of Finance, 16:8-37, 1961, the disclosures of which are incorporated by reference herein in their entirety.

What is needed is a pricing scheme that is Individual Rational for the agents, Budget Balanced for the market-maker and demonstrates high degrees of Incentive Compatibility and Allocative Efficiency.

SUMMARY OF THE INVENTION

Disclosed is a method for computing payment discounts awarded to winning agents in an exchange, said method comprising computing a Vickrey discount to each said winning agent as the difference between available surplus with all agents present minus available surplus without said winning agent, and computing said payment discounts by adjusting said Vickrey discounts so as to constrain said exchange to budget-balance.

In another aspect of the method, said adjusting step further comprises selecting a distance function comprising a metric of the distance between said payment discounts and said Vickrey discounts, minimizing said distance function under said budget-balance constraint and one or more bounding constraints, deriving a parameterized payment rule for said distance function, determining an allowable range of parameters so as to maintain budget-balance, and selecting values for said parameters within said allowable range.

In another aspect of the method, said values for said parameters are selected within said allowable range so as to minimize agent manipulation.

In another aspect of the method, said bounding constraints comprises a constraint that said payment discounts be non-negative.

In another aspect of the method, said bounding constraints comprises a constraint that said payment discounts not exceed said Vickrey discounts.

In another aspect of the method, said distance function is selected from $L_2(\Delta,\Delta^V)=(\Sigma_I(\Delta_I^V-\Delta_I)^2)^{1/2}$, $L_\infty(\Delta,\Delta^V)=\max_I|\Delta_I^V-\Delta_I|$, $L_{RE}(\Delta,\Delta^V)=\Sigma_I(\Delta_I^V-\Delta_I)/\Delta_I^V$, $L_\pi(\Delta,\Delta^V)=\Pi_I\Delta_I^V/\Delta_I$, $L_{RE2}(\Delta,\Delta^V)=\Sigma_I(\Delta_I^V-\Delta_I)^2/\Delta_I^V$, and $L_{RE}(\Delta,\Delta^V)=\Sigma_I\Delta_I^V/(\Delta_I^V-\Delta_I)$.

In another aspect of the method, said parameterized payment rule comprise a Threshold Rule $\max(0, \Delta_I^V-C)$, $C\geq 0$ if said selected distance function is $L_2(\Delta,\Delta^V)$ or $L_\infty(\Delta,\Delta^V)$, a Small Rule $\Delta_I^V$ if $\Delta_I^V\leq C$, $C\geq 0$ if said selected distance function is $L_{RE}(\Delta,\Delta^V)$, a Reverse Rule $\min(\Delta_I^V, C)$, $C\geq 0$ if said selected distance function is $L_\pi(\Delta,\Delta^V)$, a Fractional Rule $\mu\Delta_I^V$, $0\leq\mu\leq 1$ if said selected distance function is $L_{RE2}(\Delta,\Delta^V)$, and a Large Rule $\Delta_I^V$ if $\Delta_I^V\geq C$, $C\geq 0$ if said selected distance function is $L_{RE}(\Delta,\Delta^V)$.

Disclosed is a program storage device readable by machine, tangibly embodying a program of instructions executable by the machine to perform method steps for computing payment discounts awarded to winning agents in an exchange, said method steps comprising computing a Vickrey discount to each said winning agent as the difference between available surplus with all agents present minus available surplus without said winning agent, and computing said payment discounts by adjusting said Vickrey discounts so as to constrain said exchange to budget-balance.

In another aspect of the invention, said adjusting step further comprises selecting a distance function comprising a metric of the distance between said payment discounts and said Vickrey discounts, minimizing said distance function under said budget-balance constraint and one or more bounding constraints, deriving a parameterized payment rule for said distance function, determining an allowable range of parameters so as to maintain budget-balance, and selecting values for said parameters within said allowable range.

In another aspect of the invention, said values for said parameters are selected within said allowable range so as to minimize agent manipulation.

In another aspect of the invention, said bounding constraints comprises a constraint that said payment discounts be non-negative.

In another aspect of the invention, said bounding constraints comprises a constraint that said payment discounts not exceed said Vickrey discounts.

In another aspect of the invention, said distance function is selected from $L_2(\Delta,\Delta^V)=(\Sigma_i(\Delta_i^V-\Delta_i)^2)^{1/2}$, $L_\infty(\Delta,\Delta^V)= \max_i|\Delta_i^V-\Delta_i|$, $L_{RE}(\Delta,\Delta^V)=\Sigma_i(\Delta_i^V-\Delta_i)/\Delta_i^V$, $L_\pi(\Delta,\Delta^V)=\Pi_i\Delta_i^V/\Delta_i$, $L_{RE2}(\Delta,\Delta^V)=\Sigma_i(\Delta_i^V-\Delta_i)^2/\Delta_i^V$, and $L_{RE}(\Delta,\Delta^V)=\Sigma_i\Delta_i^V(\Delta_i^V-\Delta_i)$.

In another aspect of the invention, said parameterized payment rule comprises a Threshold Rule $\max(0, \Delta_i^V-C)$, $C\geq 0$ if said selected distance function is $L_2(\Delta,\Delta^V)$ or $L_\infty(\Delta,\Delta^V)$, a Small Rule $\Delta_i^V$ if $\Delta_i^V\leq C$, $C\geq 0$ if said selected distance function is $L_{RE}(\Delta,\Delta^V)$, a Reverse Rule $\min(\Delta_i^V,C)$, $C\geq 0$ if said selected distance function is $L_\pi(\Delta,\Delta^V)$, a Fractional Rule $\mu\Delta_i^V$, $0\leq\mu\leq 1$ if said selected distance function is $L_{RE2}(\Delta,\Delta^V)$, and a Large Rule $\Delta_i^V$ if $\Delta_i^V\geq C$, $C\geq 0$ if said selected distance function is $L_{RE}(\Delta,\Delta^V)$.

Disclosed is an automated system for computing payment discounts awarded to winning agents in an exchange, comprising means for computing a Vickrey discount to each said winning agent as the difference between available surplus with all agents present minus available surplus without said winning agent, means for computing said payment discounts by adjusting said Vickrey discounts so as to constrain said exchange to budget-balance, wherein said adjusting means step further comprises means for selecting a distance function comprising a metric of the distance between said payment discounts and said Vickrey discounts, wherein said distance function is selected from $L_2(\Delta,\Delta^V)=(\Sigma_i(\Delta_i^V-\Delta_i)^2)^{1/2}$, $L_\infty(\Delta,\Delta^V)=\max_i|\Delta_i^V-\Delta_i|$, $L_{RE}(\Delta,\Delta^V)=\Sigma_i(\Delta_i^V-\Delta_i)/\Delta_i^V$, $L_\pi(\Delta,\Delta^V)=\Pi_i\Delta_i^V/\Delta_i$, $L_{RE2}(\Delta,\Delta^V)=\Sigma_i(\Delta_i^V-\Delta_i)^2/\Delta_i^V$, and $L_{RE}(\Delta,\Delta^V)=\Sigma_i\Delta_i^V(\Delta_i^V-\Delta_i)$, means for minimizing said distance function under said budget-balance constraint and one or more bounding constraints, wherein said bounding constraints comprises a constraint that said payment discounts be non-negative and a constraint that said payment discounts not exceed said Vickrey discounts, means for deriving a parameterized payment rule for said distance function, wherein said parameterized payment rule comprises a Threshold Rule $\max(0, \Delta_1^V-C)$, $C\geq 0$ if said selected distance function is $L_2(\Delta,\Delta^V)$ or $L_\infty(66, \Delta^V)$, a Small Rule $\Delta_i^V$ if $\Delta_i^V\leq C$, $C\geq 0$ said selected distance function is $L_{RE}(\Delta,\Delta^V)$, a Reverse Rule $\min(\Delta_i^V, C)$, $C\geq 0$ if said selected distance function is $L_\pi(\Delta,\Delta^V)$, a Fractional Rule $\mu\Delta_i^V$, $0\leq\mu\leq 1$ is said selected distance function is $L_{RE2}(\Delta,\Delta^V)$, and a Large Rule $\Delta_i^V$ if $\Delta_i^V\geq C$, $C\geq 0$ if said selected distance function is $L_{RE}(\Delta,\Delta^V)$, means for determining an allowable range of parameters so as to maintain budget-balance, and means for selecting values for said parameters within said allowable range and wherein said values for said parameters are selected within said allowable range so as to minimize agent manipulation.

DETAILED DESCRIPTION OF PREFERRED EMBODIMENTS

The invention disclosed herein imposes budge-balance (BB) and Individual-Rationality (IR) to an exchange, while relaxing Incentive-Compatibility (IC) and Allocative Efficiency (AE). It is found that by doing so, high levels of Allocative-Efficiency (AE) are nevertheless obtained, in fact, complete AE is obtained where bids are truthful. The inventive payment scheme treats the payments computed by the Vickrey scheme as an assignment of discounts to the agents and achieves BB by reducing these discounts such that their total does not exceed available surplus. Theoretical and experimental analysis shows that discounting schemes (also called payment rules) can be designed where the manipulation possibility of agents with large degree of manipulation freedom is drastically curbed while that of the other agents is not increased. This requirement exploits the agents' inherent uncertainty about the other agents and about the degree to which manipulation can be useful. The same payment rules also result in high Allocative-Efficiency compared to other payment rules.

A novel framework is disclosed for designing Budget-Balanced payment schemes that compute and adjust Vickrey-type payment discounts to be awarded to the winning agents in an exchange. This is required because Vickrey exchanges usually are not budget-balanced, as the inventors demonstrate in their paper D. C. Parkes et al., *Achieving Budget-Balance with Vickrey-Based Payment Schemes in an Exchange*, [PUB- LICATION CITATION], the disclosures of which are incorporated by reference herein in their entirety.

It will be instructive to first discuss classical Vickrey payment schemes.

Vickrey-Based Surplus Distribution

As stated, the market-maker in an exchange has two problems to solve: winner-determination, to determine the trades executed, and pricing, to determine agent payments. A common goal in winner-determination is to compute trades that maximize surplus, the difference between bid and ask prices. These trades implement the efficient allocation with truthful bids and asks.

For example, consider a combinatorial market with four agents, wherein Agents 1 and 2 want to sell items A and B respectively, with values $v_1(A)=\$10$ and $v_2(B)=\$5$ and Agents 3 and 4 want to buy the bundle AB, with values $v_3(AB)=\$51$ and $v_4(AB)=\$40$. The efficient allocation is for agents 1 and 2 to trade with agent 3, for a net increase in value of $36. The mechanism design problem is: given bid and ask prices for A, B and AB from the agents, what trades should take place and what payments should be made and received?

The pricing problem is to determine agent payments when the exchange clears. The invention applies a Vickrey-Clarke-Groves pricing mechanism to an exchange, such as is described in Vickrey, supra; Clarke, supra; and Groves, supra. The pricing mechanism is for combinatorial exchange, in which agents can bid and ask for bundles of items and express logical constraints (e.g., "exclusive-or" and "additive-or" constraints) across bids and asks. The agent payment schemes of the invention are also applicable with any constraint on feasible trades (e.g., any level of aggregation in matching trades), or side constraints (e.g., on the volume of trade or degree of dominance by a single agent), though preferably such constraints will be fixed before bidding begins. Vickrey payments in exchanges for homogenous items, with and without combinatorial bids may be derived as special cases, as described in Werman et al., *Flexible double auctions for electronic commerce: Theory and implementation*, Decision Support Systems, 24:17-27, 1998, the disclosures of which are incorporated by reference herein in their entirety.

Computing payments in a Vickrey-based exchange will generally involve solving a number of winner-determination problems, once each without each agent that trades. Winner-determination falls into that class of problems known as "NP-hard", meaning they are assumed to require worst-case exponential time in their input size to solve, for general combinatorial exchange problems and becomes intractable as problems become large. However, the focus is on the incentive properties of the novel Vickrey-based payment schemes, and tractable winner-determination is not a present concern. Noting this, the payment schemes disclosed herein are immediately applicable to tractable special cases of combinatorial exchanges, such as are described in J. Kalagnanam et al., *Computational aspects of clearing continuous double auctions with assignment constraints and indivisible demand*, Technical report, IBM Research Report RC 21660 (97613), 2000 (To appear in *Electronic Commerce Research Journal*), the disclosures of which are incorporated by reference herein in their entirety.

Vickrey Payments

The payments in a Vickrey Exchange are defined as follows: let L denote the set of agents and G={A, B, C, . . . } denote the set of items. As notation for a trade, let $T_l \in \{-1, 0, 1\}^{|G|}$ denote an indicator vector for a trade, such that agent l buys items $\{x|T_l(x)=1, x \in G\}$ and sells items $\{x|T_l(x)=-1, x \in G\}$. Let $T=(T_l; \ldots; T_{|L|})$ denote a complete trade between all agents.

Bids and asks define a reported value, $v_l(T_l)$ for a trade $T_l$, comprising buys and sells. Bids indicate positive value for buying a bundle of items, while asks indicate negative value for selling a bundle of items. For example, if agent 1 submits a bid (AB, 10) and an ask (C, 5), then $v_l([1, 1, 0])=10$, $v_l([0, 0, -1])=-5$, $v_1([1, 1, -1])=5$. The values for other trades are constructed to be consistent with the value $-\infty$ for selling anything other than item C, zero value for buying $S \subset \{AB\}$, and no additional value for buying more than bundle AB.

Let T* denote the value-maximizing trade, given reported values, $v_l(T_l)$, from each agent, with total surplus $V^* = \Sigma_l v_l(T_l^*)$. Trades must be feasible, so that supply and demand is balanced, given a model of aggregation.

By definition, the Vickrey payment to agent l is computed as:

$$p_{vick,l} = (V_{-l})^* - V_{-l}^* \qquad (1)$$

where $(V_{-l})^*$ denote surplus from the value-maximizing trade without bids (or asks) from agent l and $V_{-l}^*$ is the value of trade T* to all agents except agent l, in other words $V_{-l}^* = V^* - v_l(T_l^*)$. Negative payments $p_{vick,l} < 0$ indicate that the agent receives money from the exchange after it clears.

An agent's Vickrey payment may be expressed as a discount, $\Delta_l^V$, from the payment, $v_l(T_l^*)$, the agent would make, given his bid and ask prices; (i.e., $p_{vick,l} = v_l(T_l^*) - \Delta_l^V$), where the Vickrey discount is computed as:

$$\Delta_l^V = V^* - (V_{-l})^* \qquad (2)$$

The Vickrey discount is always non-negative, representing smaller payments by buyers and higher payments to sellers.

Economic Properties. Vickrey payments are individual-rational (IR), because $V^* \geq (V_{-l})^*$ by a simple feasibility argument, and also strategy-proof. The proof of strategy-proofness is omitted for brevity, but is disclosed in Varian & MacKie-Mason, *Generalized Vickrey auctions*, Technical report, University of Michigan, 1995, the disclosures of which are incorporated by reference herein in their entirety.

One cannot expect budget-balance (BB) with Vickrey payments even in a standard (non-combinatorial) exchange, except in special cases. Consider again the earlier example wherein Agents 1 and 2 want to sell items A and B respectively, with values $v_1(A)=\$10$ and $v_2(B)=\$5$ and Agents 3 and 4 want to buy the bundle AB, with values $v_3(AB)=\$51$ and $v_4(AB)=\$40$. As stated earlier, the efficient allocation is for agents 1 and 2 to trade with agent 3, for a net increase in value of $36.

As an example of BB failure, consider that agents submit truthful bids in this example, Agents 1 and 2 place asks (A, $10), (B, $5) and Agents 3 and 4 place bids (AB, $51), (AB, $40). Following the analysis set forth above: $V^*=51-10-5=36$, $(V-1)^*=(V-2)^*=0$, $(V-3)^*=25$, and $(V-4)^*=36$. Agent 1's Vickery payment is $-10-(36-0)=-46$, agent 2's is $-5-(36-0)=-41$, agent 3's is $51-(36-25)=40$. The exchange runs at a loss of $47 to the market-maker.

Budget-Balanced Vickrey-based Payment Scheme

This invention provides a novel framework for payment schemes that computes Vickrey payment discounts and then adjusts them to ensure budget-balance.

The problem of determining the payment discounts is formulated as a Mathematical Optimization problem with the objective of minimizing the distance of the new payment discounts from the Vickrey discounts, provided that the new discounts do not exceed the Vickrey discounts and that their total is limited by the available surplus. To formulate this optimization problem, the available surplus and the Vickrey discounts are precomputed using usual optimization techniques and then a suitable distance function is chosen for the objective. Variables represent the amount of discount given to each winning agent (non-winners do not make/receive payments and thus do not receive discounts). Suitable distance functions include standard distance metrics such as $L_2$ and $L_\infty$ and other error functions such as relative, product, squared relative and weighted errors.

Figure 1:
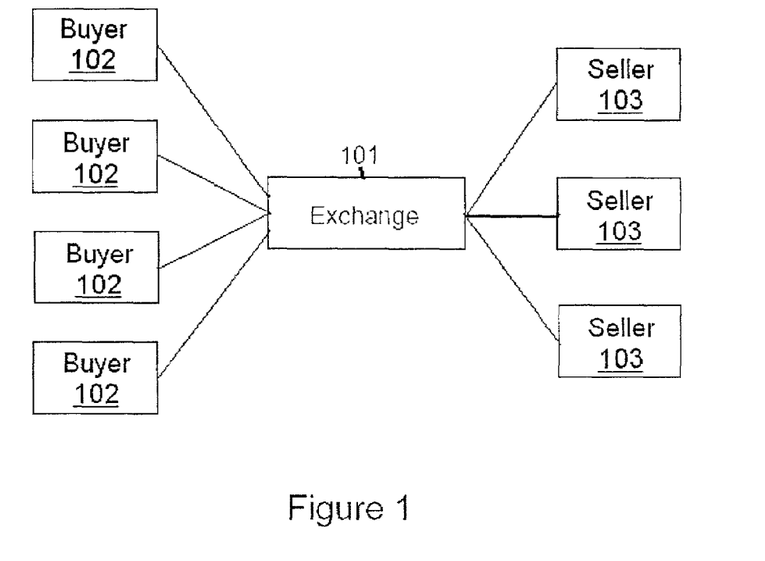
FIG. 1 is a graphical illustration of the relationship between an exchange and the participating agents (buyers and sellers).

Referring to FIG. 1, there is shown a schematic of an exchange 101, comprising a market mechanism that allows trading between multiple buyers 102 and sellers 103 (collectively called agents) by aggregating their supply and demand to clear the market. Note that auctions are a special case of exchanges where there is only one seller or one buyer. This invention assumes the most general case where multiple copies of several heterogeneous items are traded simultaneously at the exchange. Such an exchange is referred to as a "combinatorial exchange".

Figure 2:
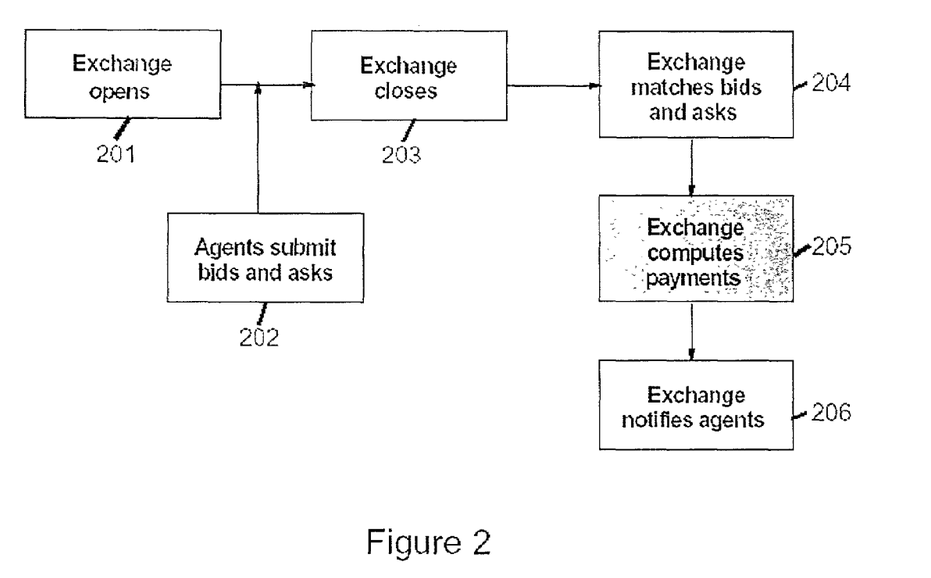
FIG. 2 illustrates the process flow of an exchange; of these steps we will focus on computing payments.

The Revelation Principle permits us to focus on single-round exchanges whose process flow is depicted on FIG. 2. While the exchange is open 201 agents may submit bids and asks 202. After the exchange closes 203 the exchange engine clears the market by computing a matching of asks and bids, also called the "Winner Determination" problem 204, and determining the payments to be made or received by the winning agents (i.e., those agents whose bids or asks were accepted and resulted in a trade), also called the "Pricing" problem 205. Finally, all participating agents are notified 206.

Figure 3:
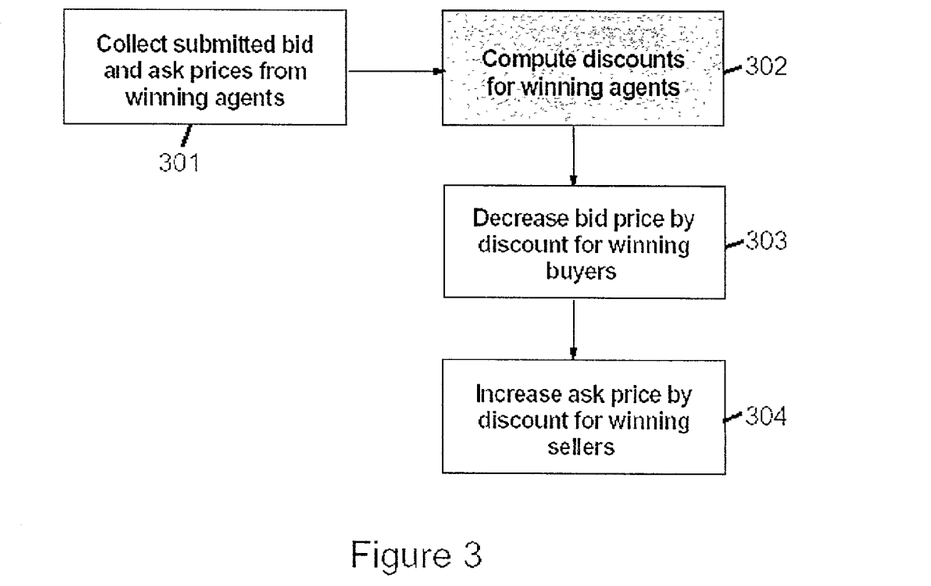
FIG. 3 illustrates the flow for computing payments. Further emphasis is on computing the discounts given to the winning agents.

Referring to FIG. 3, rather than immediately computing the payments to be made or received by the winning agents, we will instead first compute non-negative Vickrey discounts to be given to these agents and then adjust them to meet the budget-balance requirements of the invention. Bid and ask prices are collected from winning agents 301, followed by the computation of individual Vickrey discounts for these agents 302. For a winning buyer the payment to be made is computed as the buyer's original bid price less the Vickrey discount 303. For a winning seller the payment to be received is computed as the seller's original ask price increased by the Vickrey discount 304.

Figure 4:
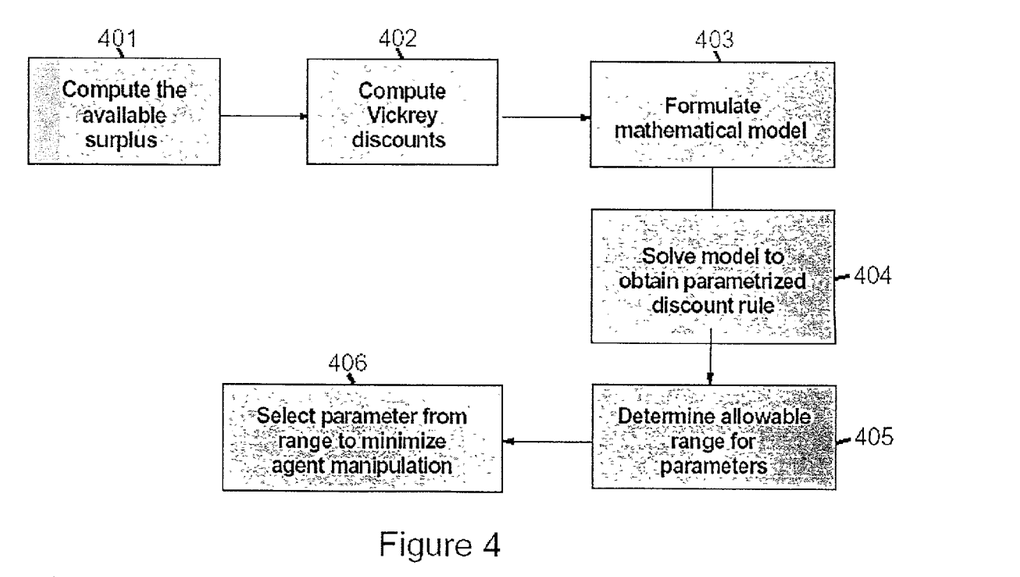
FIG. 4 illustrates the flow for computing discounts given to the winning agents. All these steps will be illustrated in more detail in further figures.

Referring to FIG. 4, a flow chart is shown depicting the calculation of the discounts. This is done by first calculating the available surplus $V^*$ at node 401, then computing the Vickrey discounts $\Delta^V$ at node 402, formulating a mathematical model 403, solving the model to obtain a parameterized discount rule 404, determining a range for the parameters such that a Budget-Balance constraint is met 405 and, finally, if a distribution of agent valuations (that is, the probability distribution of the preferences of the agents over different items and bundles of items expressed with a real number which is commonly interpreted as the price the agent would pay for the bundle. These are commonly derived through statistical methods from historical information) is known, selecting a parameter from this range so as to minimize agent manipulation 406.

Figure 5:
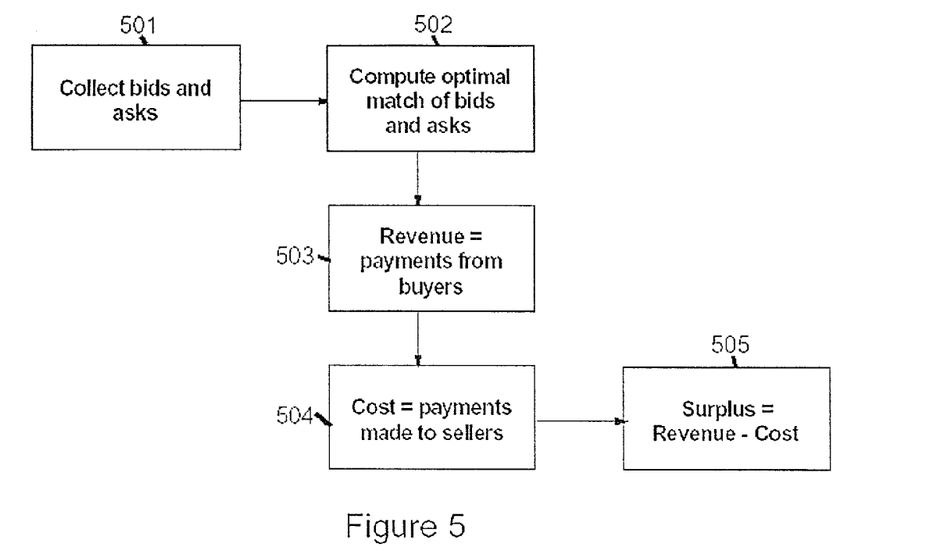
FIG. 5 illustrates the flow for computing the available surplus.

Referring to FIG. 5, a flowchart depicting the derivation of the available surplus $V^*$ (node 401 in FIG. 4) is shown. The available surplus is derived from the result of the optimal match determined in node 204 of FIG. 2. After the bids and asks are collected 501 an optimal (profit-maximizing) match of bids to asks is determined at node 502.

The payment schemes disclosed herein are immediately applicable to tractable special cases of combinatorial exchanges (see Kalagnanam, supra). To compute the surplus, first we compute the revenue as the total payment to be collected from the winning buyers if no discounts were given 503, then computing the cost as the total payment to be made to winning sellers if no discounts were given 504. The available surplus $V^*$ is then the revenue less the cost 505. The exchange cannot distribute more than the available surplus in form of discounts if constrained to Budget-Balance.

Figure 6:
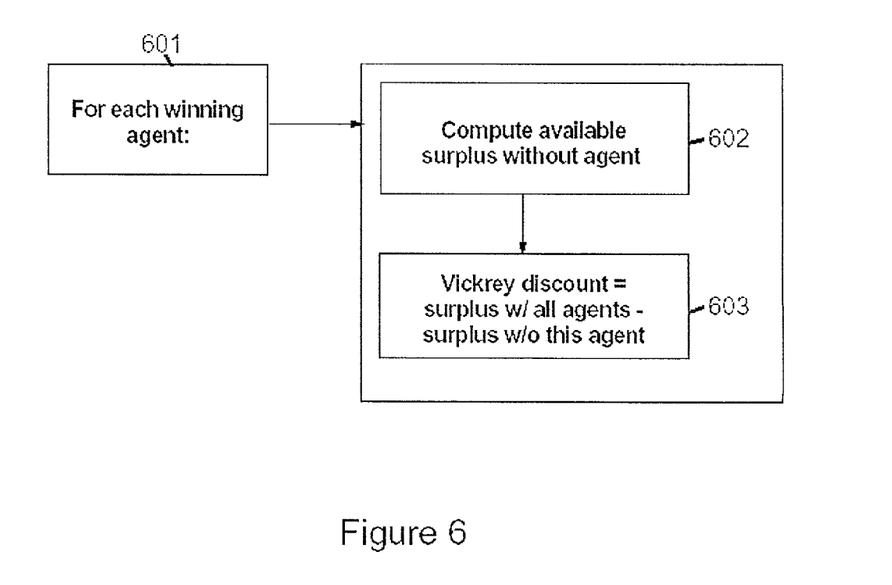
FIG. 6 depicts the computation of Vickrey discounts for winning agents.

Referring to FIG. 6, Vickrey discounts are computed for all winning agents (agents who are not winners do not make or receive payments and thus do not receive discounts). The computation of Vickrey discounts described here is an application of the Vickrey-Clarke-Groves pricing mechanism, well known from the literature as is described in Vickrey, supra; Clarke, supra; and Groves, supra. For each of the winning agents 601 we need to compute the surplus available in the exchange if this agent was not present to submit any bids or asks 602, using the same technique as described with respect to FIG. 5. Note that this involves solving a problem equally as difficult as solving the matching problem with all agents. The Vickrey discount to be given to an agent is computed as the difference between the available surplus with all agents present less the available surplus without the agent 603. Note that discounts are non-negative by definition because the surplus without an agent is not more than the surplus with all agents.

Figure 7:
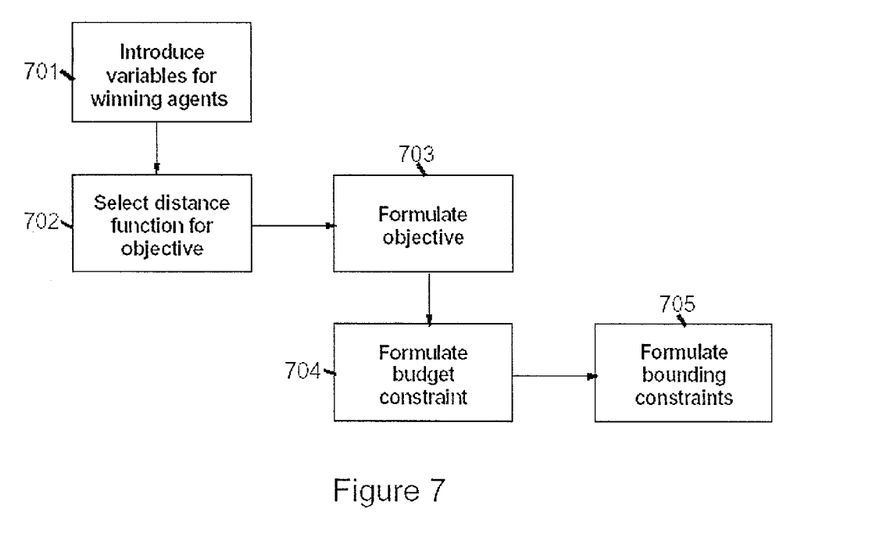
FIG. 7 illustrates the flow for formulating the mathematical model.

Referring to FIG. 7, the problem of determining the discounts to be given to the winning agents is formulated as a mathematical model. For the model we define what are the variables, the objective, and the constraints. Variables representing the amount of discount given to the winning agents ($\Delta_l$, $l \in W$, where W is the set of winning agents) are introduced for all winning agents at node 701. Again, agents who are not winners do not make or receive payments and do not receive any discounts. The objective of the problem is to minimize the distance of the discount variables from the Vickrey discounts: $L(\Delta, \Delta^V)$ where $L(\ )$ is a suitable distance function. These distance functions could be standard metrics such as $L_2$ and $L_\infty$ or other error functions as illustrated in the left column of the table in FIG. 9. After selecting the distance function 702 the objective is then formulated as $\min L(\Delta, \Delta^V)$ 703. The constraints to be added are the budget constraint 704 requiring that the sum of the discount variables does not exceed the available surplus ($V^*$, as computed in FIG. 5): $\Sigma_{l \in W} \Delta_l \leq V^*$ and the bounding constraints 705 requiring that the discount variables are non-negative and are bounded from above by the Vickrey discounts: $0 \leq \Delta_l \leq \Delta^V_l$, $k \in W$.

Figure 8:
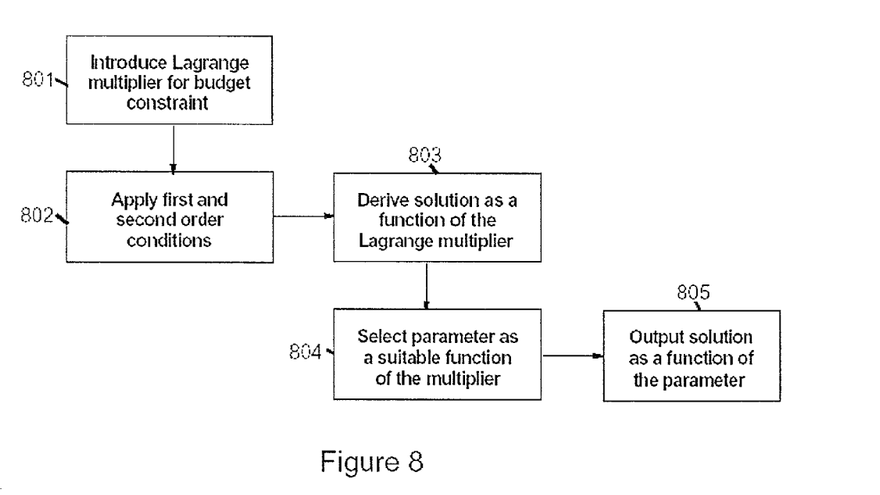
FIG. 8 illustrates the flow for solving the mathematical model to obtain parameterized discount rules.

Referring to FIG. 8, the parametrized discount rule is obtained. To solve the problem captured by the above model, one may use Lagrangian optimization. For any distance function, an analytic expression, a so called discount rule or payment rule, can be derived for the solution of the model. First a Lagrange multiplier $\lambda$ is introduced for the budget constraint 801, which leads us to the Lagrangian optimization problem of $\min L(\Delta, \Delta^V) + \lambda (\Sigma_{l \in W} \Delta_l - V^*)$ such that $0 \leq \Delta_l \leq \Delta^V_l$, $l \in W$. Applying First and Second Order Conditions 802 an analytic expression can be derived for the solution as a function of the Lagrange multiplier $\lambda$ at node 803. A parameter is then selected as a suitable function of the Lagrange multiplier 804 and then the solution can be outputted as a function of the parameter 805.

Figure 9:
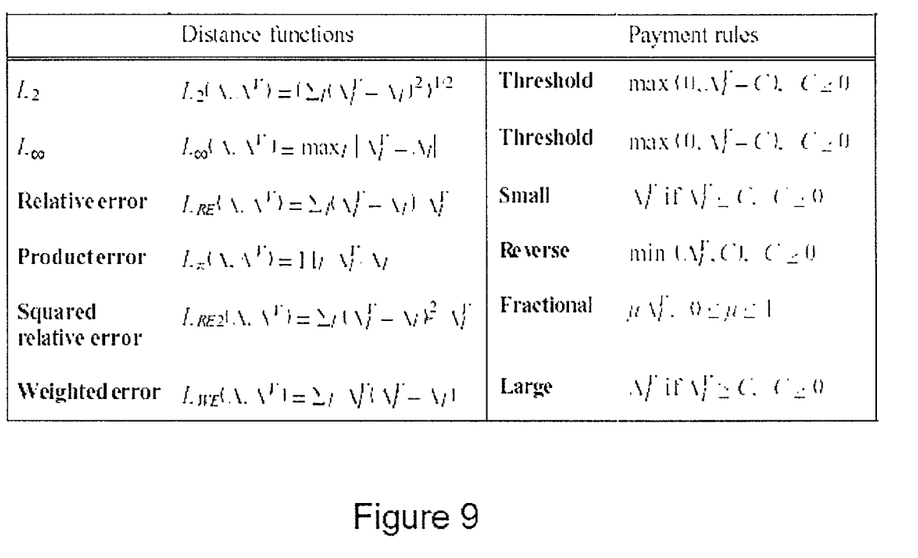
FIG. 9 summarizes the distance functions and the corresponding discount rules in a table.

Referring to FIG. 9, there is shown a table depicting payment rules and their associated distance metrics. The right column of the table contains the discount (payment) rules corresponding to the distance functions listed on the left.

Figure 10:
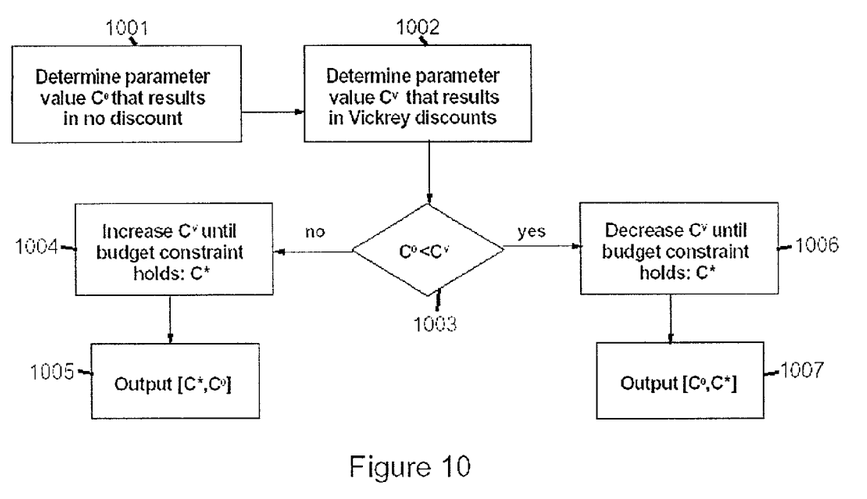
FIG. 10 illustrates the flow for computing the allowable range for parameters.

Referring to FIG. 10, there is shown the flowchart for determining an allowable range of parameters. Note that, because the budget constraint was relaxed when the discount (payment) rules were derived, the exchange may not be Budget-Balanced for some values of the parameters. Thus, an allowable range for the parameters so as to meet the Budget-Balance requirement will need to be determined. First, a value for the parameter, $C^O$, is determined at which the discount rule results in no discounts to the winning agents 1001. When no discounts are distributed the exchange is Budget-Balanced. Then another value for the parameter, $C^V$, is determined so as to result in Vickrey discounts 1002. We can assume that the exchange is not Budget-Balanced with the Vickrey discounts (otherwise we can simply distribute Vickrey discounts, which implies IC and AE). Thus there is a well defined value for the parameter between $C^O$ and $C^V$ where the exchange is exactly Budget-Balanced. Depending on whether $C^O$ is less than $C^V$ 1003 or not, we either decrease or increase $C^V$ until the budget constraint is met 1006 or 1004 and output the range between $C^O$ and this value 1007 or 1005.

Figure 11:
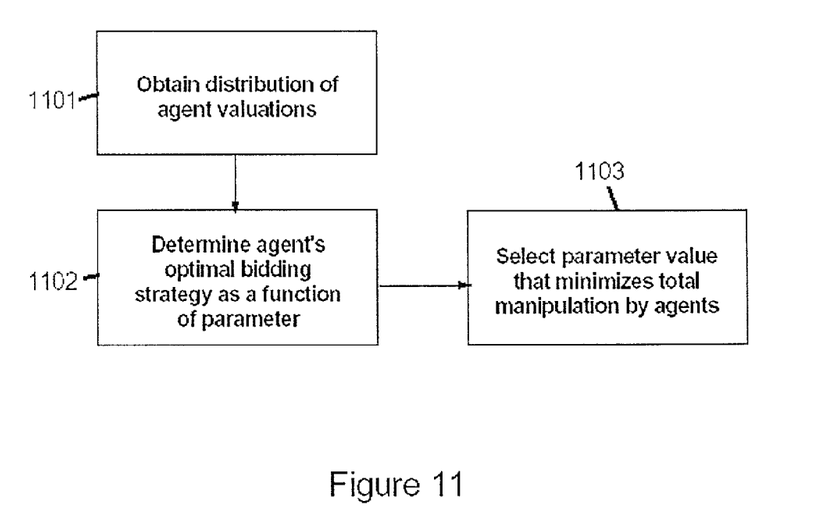
FIG. 11 illustrates the flow for selecting a parameter from the allowable range so as to minimize the manipulation possibility of agents.

Referring to FIG. 11, a best parameter value is selected for each discount (payment) rule so as to minimize agent manipulation. This will generally require sufficient information about the agent valuations. Assuming the distribution of agent valuations is available 1101, the agents' optimal bidding strategy can be determined as a function of the parameter of the discount rule 1102, where the agents would choose the amount by which to manipulate to maximize their expected utility resulting from the manipulation. The exchange selects a parameter from the range that provides Budget-Balance so that the total expected utility of manipulation across all the winning agents is minimized 1103.

The invention may easily be adapted to automation as by, for example, tangibly embodying a program of instructions upon a storage media, readable by a machine capable of executing the instructions, such as a computer.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for computing payment discounts awarded to a plurality of winning agents in an exchange, said method comprising:

computing, by a processor, a Vickrey discount to said plurality of winning agents in a cleared exchange as the difference between available surplus with all agents present minus available surplus without said plurality of winning agents, wherein the available surplus is a difference between an asked for payment from sellers and a bid payment from buyers, and wherein the winning agents are sellers and buyers matched to one another; and computing, by the processor, said payment discounts by adjusting said Vickrey discounts so as to constrain said exchange to budget-balance, wherein said Vickrey discounts are equal to or less than the available surplus, and wherein said adjusting step further comprises:

minimizing a distance function under said budget-balance constraint and one or more bounding constraints, said distance function comprising a metric of the distance between said payment discounts and said Vickrey discounts;

deriving a parameterized payment rule for said distance function;

determining an allowable range of parameters so as to maintain budget-balance; and selecting values for said parameters within said allowable range, wherein said values for said parameters are selected within said allowable range so as to reduce agent manipulation across said plurality of winning agents upon determining each agent's bidding strategy as a function of said parameters.

2. The method of claim 1 wherein said bounding constraints comprises a constraint that said payment discounts be non-negative.

3. The method of claim 1 wherein said bounding constraints comprises a constraint that said payment discounts not exceed said Vickrey discounts.

4. The method of claim 1 wherein said distance function is one of:

$L_2(\Delta,\Delta^V) = (\Sigma_l(\Delta_l^V - \Delta_l)^2)^{1/2}$, $L_\infty(\Delta,\Delta^V) = \max_l |\Delta_l^V - \Delta_l|$, $L_{RE}(\Delta,\Delta^V) = \Sigma_l(\Delta_l^V - \Delta_l)/\Delta_l^V$, $L_\pi(\Delta,\Delta^V) = \Pi_l \Delta_l^V / \Delta_l$, $L_{RE2}(\Delta,\Delta^V) = \Sigma_l (\Delta_l^V - \Delta_l)^2 / \Delta_l^V$, and $L_{RE}(\Delta,\Delta^V) = \Sigma_l \Delta_l^V (\Delta_l^V - \Delta_l)$, wherein $\Delta_l^V$ is said Vickrey discount for an agent l and $\Delta_l$ is a new payment discount for the agent l.

5. The method of claim 4, wherein said parameterized payment rule comprises:

a Threshold Rule $\max(0, \Delta_l^V - C)$, $C \geq 0$ if said distance function is $L_2(\Delta,\Delta^V)$ or $L_\infty(\Delta,\Delta^V)$;

a Small Rule $\Delta_l^V$ if $\Delta_l^V \leq C$, $C \geq 0$ if said distance function is $L_{RE}(\Delta,\Delta^V)$;

a Reverse Rule $\min(\Delta_l^V, C)$, $C \geq 0$ if said distance function is $L_\pi(\Delta,\Delta^V)$;

a Fractional Rule $\mu \Delta_l^V$, $0 \leq \mu \leq 1$ if said distance function is $L_{RE2}(\Delta,\Delta^V)$; and a Large Rule $\Delta_l^V$ if $\Delta_l^V \geq C$, $C \geq 0$ if said distance function is $L_{RE}(\Delta,\Delta^V)$, wherein C is a given parameter.

6. A program storage device readable by machine, tangibly embodying a program of instructions executable by the machine to perform method steps for computing payment discounts awarded to a plurality of winning agents in an exchange, said method steps comprising:

computing a Vickrey discount to said plurality of winning agents in a cleared exchange as the difference between available surplus with all agents present minus available surplus without said plurality of winning agents, wherein the available surplus is a difference between an asked for payment from sellers and a bid payment from buyers, and wherein the winning agents are sellers and buyers matched to one another; and computing said payment discounts by adjusting said Vickrey discounts so as to constrain said exchange to budget-balance, wherein said Vickrey discounts are equal to or less than the available surplus, and wherein said adjusting step further comprises:

minimizing a distance function under said budget-balance constraint and one or more bounding constraints, said distance function comprising a metric of the distance between said payment discounts and said Vickrey discounts;

deriving a parameterized payment rule for said distance function;

determining an allowable range of parameters so as to maintain budget-balance; and selecting values for said parameters within said allowable range, wherein said values for said parameters are selected within said allowable range so as to reduce agent manipulation across said plurality of winning agents upon determining each agent's bidding strategy as a function of said parameters.

7. The program storage device of claim 6 wherein said bounding constraints comprises a constraint that said payment discounts be non-negative.

8. The program storage device of claim 6 wherein said bounding constraints comprises a constraint that said payment discounts not exceed said Vickrey discounts.

9. The program storage device of claim 6 wherein said distance function is one of:

$$L_2(\Delta,\Delta^V)=(\Sigma_l(\Delta_l^V-\Delta_l)^2)^{1/2},$$

$$L_\infty(\Delta,\Delta^V)=\max_l|\Delta_l^V-\Delta_l|,$$

$$L_{RE}(\Delta,\Delta^V)=\Sigma_l(\Delta_l^V-\Delta_l)/\Delta_l^V,$$

$$L_\pi(\Delta,\Delta^V)=\Pi_l\Delta_l^V/\Delta_l,$$

$$L_{RE2}(\Delta,\Delta^V)=\Sigma_l(\Delta_l^V-\Delta_l)^2/\Delta_l^V, \text{ and}$$

$$L_{R\bar{E}}(\Delta,\Delta^V)=\Sigma_l\Delta_l^V(\Delta_l^V-\Delta_l),$$

wherein $\Delta_l^V$ is said Vickrey discount for an agent l and $\Delta_l$ is a new payment discount for the agent l.

10. The program storage device of claim 9, wherein said parameterized payment rule comprises:

a Threshold Rule $\max(0,\Delta_l^V-C)$, $C\geq 0$ if said distance function is $L_2(\Delta,\Delta^V)$ or $L_\infty(\Delta,\Delta^V)$;

a Small Rule $\Delta_l^V$ if $\Delta_l^V\leq C$, $C\geq 0$ if said distance function is $L_{RE}(\Delta,\Delta^V)$;

a Reverse Rule $\min(\Delta_l^V,C)$, $C\geq 0$ if said distance function is $L_\pi(\Delta,\Delta^V)$;

a Fractional Rule $\mu\Delta_l^V$, $0\leq\mu\leq 1$ if said distance function is $L_{RE2}(\Delta,\Delta^V)$; and a Large Rule $\Delta_l^V$ if $\Delta_l^V\geq C$, $C\geq 0$ if said distance function is $L_{R\bar{E}}(\Delta,\Delta^V)$, wherein C is a given parameter.

11. The method of claim 1, wherein the computation of the Vickrey discount to said plurality of winning agents is performed after the exchange is cleared.

12. The program storage device of claim 6, wherein the computation of the Vickrey discount to said plurality of winning agents is performed after the exchange is cleared.

* * * * *